TENSION LOCK-UP DEVICE

Filed March 31, 1958 2 Sheets-Sheet 1

INVENTOR.
DAVID J. SCOTT
BY Pennie, Edmonds,
Morton, Barrows & Taylor.
ATTORNEYS Sept. 20, 1960 D. J. SCOTT 2,953,090

TENSION LOCK-UP DEVICE

Filed March 31, 1958 2 Sheets-Sheet 2

INVENTOR.
DAVID J. SCOTT
Pennie, Edmonds, Morton, Barrows & Taylor
ATTORNEYS

United States Patent Office 2,953,090
Patented Sept. 20, 1960

2,953,090

TENSION LOCK-UP DEVICE

David J. Scott, Plainfield, N.J., assignor to Wood Newspaper Machinery Corporation, Plainfield, N.J., a corporation of Virginia Filed Mar. 31, 1958, Ser. No. 725,301

7 Claims. (Cl. 101—378)

This invention relates generally to a tension lock-up device for locking stereotype printing plates to a printing cylinder and more particularly to a tension lock-up device which will secure printing plates to a printing cylinder at a predetermined and uniform pressure independent of outside force exerted on the lock-up device during the lock-up process.

In modern printing presses wherein stereotype printing plates are locked upon printing cylinders, it is important that the printing plates be locked and released quickly and accurately. It is particularly true that the printing plates be locked accurately if the plates are to be used in color printing since the slightest movement of one plate out of desired alignment will result in one color overlapping another. It is further advisable that the printing plate be held to the printing cylinder with a predetermined pressure evenly distributed over the plate in order to prevent warping which would result in eventual misalignment. If too much tension is exerted on the plate by the lock-up mechanism, there is a possibility of the plate breaking during the run of the press. It is also important that the lock-up pressure be uniform since, during the run of the press, the fingers holding the plate on to its printing cylinder may wear into the plate and so allow the plate to shift position, if no provision to allow take-up is provided.

Many printing cylinders in use today are capable of having mounted thereon four separate printing plates longitudinally of one another. Often it is necessary to change one plate or reposition a single plate on the printing cylinder without respect to the others. It is, therefore, desirous to have independent holding means for each plate which will take up a minimum of space in the printing cylinder and which at the same time will afford maximum adjustability of each plate.

In order to overcome the aforementioned difficulties I propose to provide for a uniform tension lock-up device which will exert a uniform predetermined tension on the printing plates independent of the force used to lock-up individual plates. I also propose to provide for a lock-up device wherein longitudinally adjacent plates of a printing cylinder having a plurality of plates may be adjusted independently of one another.

Broadly, I propose to have a series of holding fingers mounted on a rotatable shaft which extends longitudinally of a printing cylinder wherein the fingers are adapted to engage recesses in the printing plates. Tension fingers are attached to a rotatable tension shaft and are adapted also to engage recesses in an opposite end of the printing plates than that engaged by the holding fingers. The tension shaft has a gear on one end which meshes with a worm shaped portion of an operating member which is adapted to move both in a rotational and a longitudinal direction. This member is biased outwardly of the printing cylinder by means of a spring of set strength. When the member is rotated by an outside force it in turn rotates the tension shaft which brings the tension fingers into contact with the printing plate. Upon further rotation of the member, the fingers are caused to engage the printing plate at a predetermined pressure determined by the strength of the spring. Further rotation of the member will cause the member to move longitudinally to compress the spring while the tension shaft remains fixed.

I provide further for coaxial tension shafts to secure each of the printing plates on a printing cylinder having a plurality of longitudinally extending printing plates, whereby each plate may be locked up and released independently of an adjacent plate.

Referring to the drawings in which a preferred embodiment of my invention is illustrated, Fig. 1 is a side broken view of a printing cylinder showing a series of longitudinally adjacent plates mounted thereon;

Figures 1, 2:
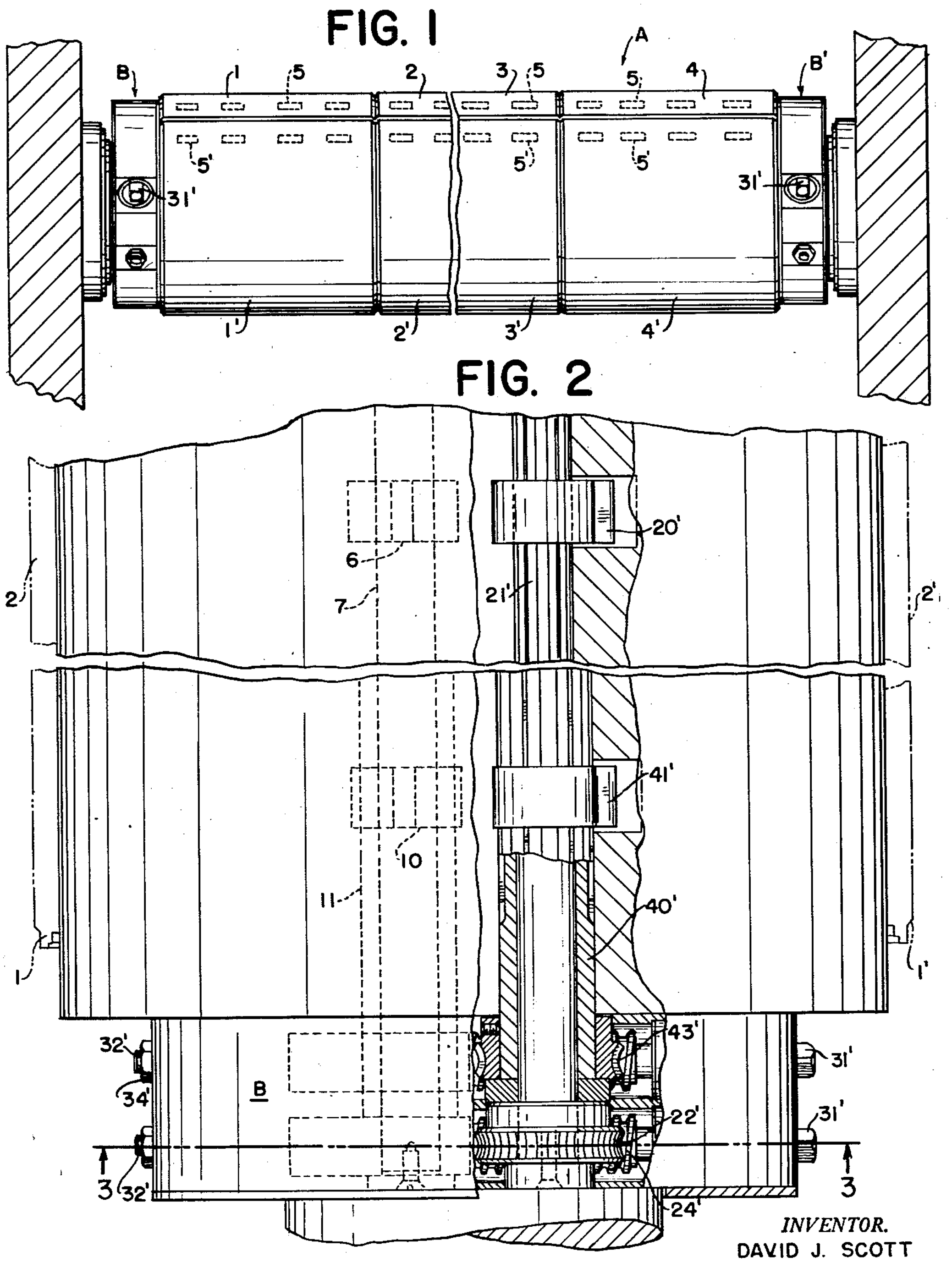
Fig. 2 is an enlarged partial sectional plan view of an end of a printing cylinder as shown in Fig. 1.

Referring to the drawings in detail and in particular Fig. 1, A denotes generally a printing cylinder having a left end portion B and a right end portion B′. Two series of four longitudinally adjacent stereotype printing plates 1, 2, 3 and 4 and 1′, 2′, 3′ and 4′ are secured to the two halves of the printing cylinder. All the printing plates are similar and are of a semi-circular shape having therein at each end recesses 5 and 5′ (as shown in Fig. 3) which are adapted to receive holding and tension fingers which secure the plate to the printing cylinder.

Figure 3:
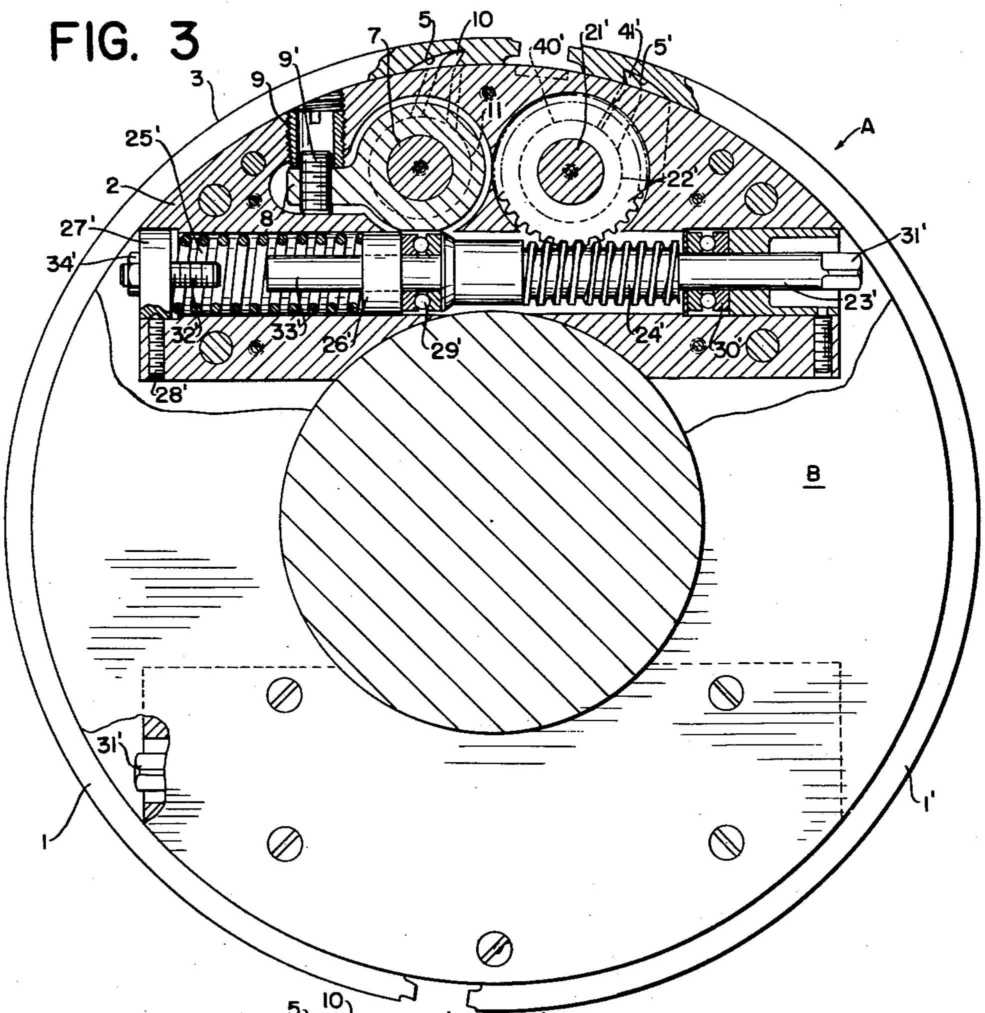
Fig. 3 is a partial sectional side view of Fig. 2 taken along lines 3—3 showing the device in initial lock-up position.

Referring to Figs. 2 and 3, holding fingers 6 are mounted upon a holding shaft 7 which has integral therewith at one end a lug 8. Cylinder A has extending through a portion thereof above lug 8 a tapped hole in which is screwed a hollow set screw 9 which in turn bears on an upper portion of the lug. A second set screw 9′ extends through hollow screw 9 into a tapped portion of the lug 8 and bears on a portion of end B of the cylinder. It is readily seen that by adjustment of screws 9 and 9′, that shaft 7 and thus finger 6 may be locked in any desired position. While only one finger 6 is shown in the drawings, it is to be understood that there are sufficient fingers to engage each recess. Thus, in the unit shown, there would be four holding fingers on shaft 7 for the four recesses of each plate as shown in Fig. 1.

The holding fingers 6 attached to shaft 7 engage the printing plate 2, while the printing plate 1, nearest the end of the cylinder, is engaged by fingers 10 which are attached to a hollow shaft 11 surrounding shaft 7. This hollow shaft has an adjustment feature similar to the set screw 9 and is adjacent thereto, but for clarity is not shown in the drawings.

Tension fingers 20′ which are attached to a tension shaft 21′, engage the end of the plate 21 to secure it to the printing cylinder. Mounted on the end of tension shaft 21′ is a gear 22′.

Figure 4:
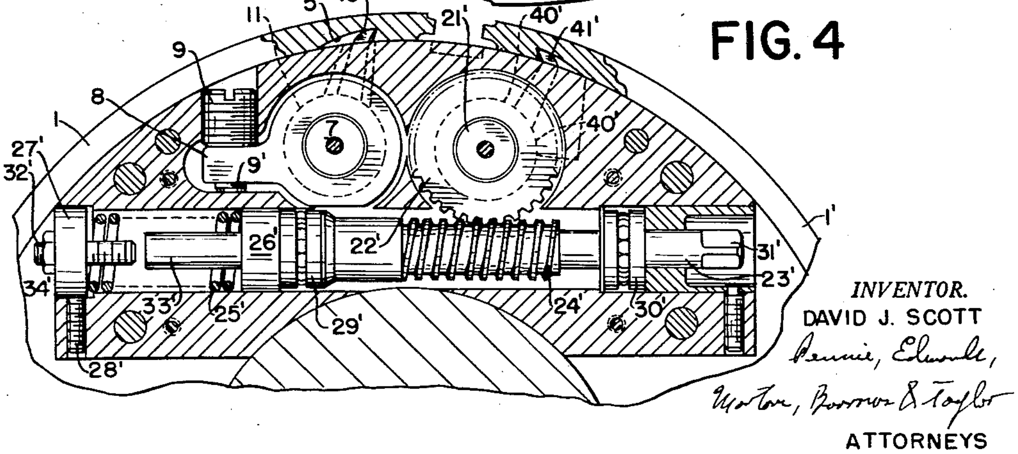
Fig. 4 is a partial broken side view, similar to Fig. 3, showing the device in final lock-up position.

While I have shown in Fig. 3 holding finger 10 acting on plate 1 and tension finger 41′ acting on plate 1′, it is apparent that similar structure would be included on the bottom of the cylinder in order that the other end of the plates 1 and 1′ might be held on to the printing cylinder. That is to say, plate 1 will have tension fingers similar to 41′ for holding it to the cylinder while plate 1′ will have holding fingers similar to 10 for holding it to the cylinder. Also it is apparent that in a printing cylinder having four printing plates as shown in Fig. 1, another lock-up mechanism similar to that shown in Figs. 3 and 4 would be carried on the end B′ of the cylinder for locking-up plates 3, 3′, 4 and 4′.

An operating member 23' which is both movable along and rotatable about its longitudinal axis extends through end B of the printing cylinder and has thereon a worm portion 24' which in turn meshes with gear 22'. A spring 25' is placed between collar 26', which is loosely mounted on an extension of member 23', and plug 27' which is held to the printing cylinder by means of set screw 28'. It is thus seen that spring 25' urges member 26' away from the plug 27'. Thrust bearing assemblies 29' and 30' are provided so that member 23' is easily rotatable in the housing. Member 23' is further provided with a serrated portion 31' so that a handle may be fitted thereon in order that it may be rotated. Adjustable stop screw 32' extends through plug 27' to limit compression of spring 25' by bearing on stud portion 33' of member 23'. The position of screw 32' and thus the limit of compression of spring 25' is regulated by means of lock nut 34'.

When member 23' is rotated, it will in turn rotate gear 22' thus bringing fingers 20' into engagement with the printing plate 2' as shown in Fig. 2. Upon further rotation of member 23', the fingers 20' will be forced further into contact with plate 2' until the compression strength of spring 25' is overcome. Up to this point, worm portion 24' and gear 22' act as a normal worm-wheel arrangement. Any further rotation of member 23' will then overcome the compression force of spring 25' so allowing member 23' to move longitudinally further into the printing cylinder. This further movement is akin to a rack-pinion arrangement.

It is thus seen that no matter how many turns are made by a press operator upon member 23' during lock-up, that an undue pressure cannot be exerted on the printing plate by the tension fingers because pressure over the desired predetermined figure will be absorbed by spring 25'. This feature allows for faster lock-up since the operator does not have to gauge accurately the number of turns of member 23'. Further, if during the run of the press fingers 20' wear into the plate so that the pressure between the two is decreased, then the spring 25' will drive the member 23' outwardly to make the worm and gear perform as a rack and pinion and so bring the fingers back into engagement with the plate at the desired predetermined pressure.

Hollow shaft 40' likewise has tension fingers 41' mounted thereon which are adapted to engage printing plate 1'. This shaft 40' likewise has mounted on the end thereof a gear 43' which in turn is engaged by a member similar in all respects to member 23'. This structure has not been illustrated since it is similar to that shown in Figs. 3 and 4.

While I have shown a preferred embodiment of my invention, it will be understood that my invention is not limited to the particular structure shown, except so far as recited in the appended claims.

I claim:

1. A tension lock-up device for securing a stereotype printing plate comprising a printing cylinder, at least one lock-up mechanism carried by said printing cylinder for engaging a printing plate, an operating member movable along and rotatable about its longitudinal axis for adjusting said lock-up mechanism to lock up and release positions whereby said operating member is both rotated about and moved along its longitudinal axis to effectuate lock-up and release of said printing plate to said printing cylinder, and uniform pressure means for exerting a predetermined minimum of pressure on each of said lock-up mechanisms on said plates independent of rotation of said operating member beyond a predetermined position.

2. A tension lock-up device according to claim 1, wherein said movable and rotatable member may be rotated to a predetermined amount to exert a predetermined pressure on said lock-up device and wherein any additional rotatable movement will result in said member moving in a longitudinal direction, and said uniform pressure means comprising a spring positioned between said movable member and said printing cylinder to oppose longitudinal movement of said member.

3. A tension lock-up device according to claim 1, having a plurality of lock-up mechanisms, a plurality of movable and rotatable members, and a plurality of uniform pressure means, each of said lock-up mechanisms, movable and rotatable members and uniform pressure means securing separate printing plates to said printing cylinder.

4. A tension lock-up device for securing stereotype printing plates to a printing cylinder, comprising holding fingers adapted to engage recesses in each of said plates, a rotatable holding shaft having said holding fingers mounted thereon, tension fingers adapted to engage recesses in each of said plates, a rotatable tension shaft having said tension fingers mounted thereon, a gear mounted on one end of said tension shaft, an operating longitudinally movable and rotatable member having a portion thereof worm shaped and being askew of said tension shaft, said worm shaped portion being in engagement with said gear, and a spring urging said member in one direction; said holding shaft and said tension shaft, said member and said spring all being carried by said printing cylinder.

5. A tension lock-up device according to claim 4, having a plurality of coaxial holding shafts and coaxial tension shafts; one said tension shaft and one said holding shaft for each of said printing plates secured whereby one printing plate may be locked up or released independent of an adjacent printing plate.

6. A tension lock-up device according to claim 4 for securing longitudinally adjacent printing plates on a printing cylinder having a first hollow holding shaft, a second solid holding shaft inside of and coaxial with said first holding shaft, a first hollow tension shaft and a second solid tension shaft inside of and coaxial with said first hollow tension shaft, said fingers on said first hollow holding shaft and said first hollow tension shaft engaging a printing plate nearest an end of said printing cylinder, and means for rotating said shafts independently.

7. A constant pressure device comprising a housing, a longitudinally movable and rotatable member in said housing having a portion thereof worm shaped, a spring of set strength biasing said member outwardly of said housing, a rotatable shaft in said housing askew of said member and having a gear thereon in engagement with said worm shaped portion, fingers on said shaft adapted to engage an object; said member upon rotation rotating said shaft until said fingers engage said object at a predetermined pressure and upon further rotation of said member, said member moving longitudinally into said housing against the force of said spring.

References Cited in the file of this patent

UNITED STATES PATENTS

| | | |
|---|---|---|
| 1,521,665 | Zarkin | Jan. 6, 1925 |
| 2,474,127 | Tollison et al. | June 21, 1949 |
| 2,621,590 | Faeber | Dec. 16, 1952 |
| 2,645,177 | Dressel et al. | July 14, 1953 |
| 2,775,198 | Johnson et al. | Dec. 25, 1956 |